United States Patent Office 3,496,135
Patented Feb. 17, 1970

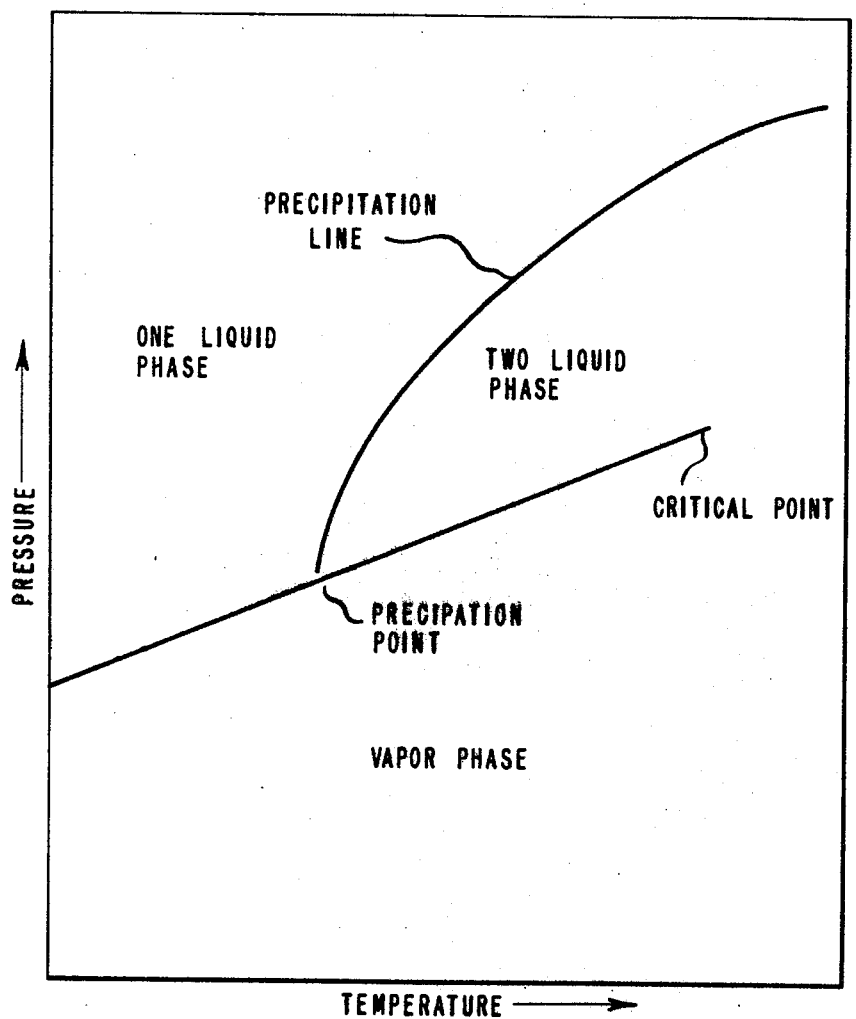

3,496,135
CRUDE EPDM COPOLYMER STABILIZED WITH A LEWIS BASE
Stanley W. Caywood, Jr., Wilmington, Del., assignor to E. I. du Pont de Nemours and Company, Wilmington, Del., a corporation of Delaware
Filed Feb. 2, 1968, Ser. No. 702,603
Int. Cl. C08f 45/58
U.S. Cl. 260—45.8         10 Claims

ABSTRACT OF THE DISCLOSURE

Process for stabilizing a sulfur-curable ethylene copolymer crude reaction product mixture resulting from copolymerization of ethylene, with a coordination catalyst containing halogen and aluminum, which comprises essentially admixing said crude mixture with 0.2–5 gram moles of a Lewis base per gram-atom of aluminum in said mixture.

BACKGROUND OF THE INVENTION

Sulfur-curable ethylene copolymer elastomers are generally polymerized with coordination catalysts containing organoaluminum halides and transition metal compounds such as vanadium tetrachloride, vanadium oxytrichloride, vanadium tris(acetylacetonate) and the like or titanium compounds such as titanium tetrachloride. Following polymerization and recovery of the polymer according to prior art practices, it is important to remove practically all catalyst residues.

Unless the catalyst residues are removed or inactivated in some way, heating of the crude polymerization reaction product mixture will tend to degrade the polymer. It has been the practice in the art to wash such polymers thoroughly with water to remove catalyst residues therefrom and provide a polymer product substantially free of degrading contaminants. Because washing is an expensive procedure, there has been a need for a method of stabilizing crude polymerization reaction mixtures against the degrading effects of heat during subsequent processing of the polymer.

SUMMARY OF THE INVENTION

According to this invention there is provided a process for stabilizing a crude ethylene copolymer polymerization reaction mass against high temperature degradation without washing to remove catalyst residues. According to this process a crude reaction product mixture resulting from copolymerization of ethylene and at least one other alpha olefin with a coordination catalyst containing halogen and aluminium is admixed with an anti-degradation agent in the form of a Lewis base in the amount of 0.2–5 gram moles Lewis base per gram-atom of aluminum in the crude reaction product mixture. Thereafter the mixture can be processed at elevated temperatures without adverse effect.

According to a preferred embodiment of the invention the polymer is recovered from the polymerization reaction product mixture, after admixing with anti-degradation agent, by heating the mixture, while maintaining sufficient pressure to keep the mixture in the liquid phase, to a temperature at which two liquid phase form, separating the two phases by decantation and evaporating solvent from the coplymer rich phase. The anti-degradation agent protects the copolymer from degradation under the elevated temperatures and pressures necessary to produce the phase separation.

DRAWING

The drawing illustrates a typical phase diagram showing the behavior of solvent solutions of ethylene copolymers under various conditions of temperature and pressure. Such a diagram is useful when the invention is operated in accordance with the preferred embodiment described above whereby after treatment with anti-degradation agent, the polymer is separted from the bulk of the solvent present by phase decanation.

DETAILS OF THE INVENTION

It has been found that the polymer degrading components resulting from copolymerization of ethylene, in the presence of a coordination catalyst containing halogen and aluminum can be inactivated by treating the polymerization reaction product mixture with an anti-degradation agent. Such treatment in accordance with this invention permits further processing of the crude reaction mixture at elevated temperatures of 150° C. and higher, practically up to the decomposition temperature of the polymer, without serious degradation.

The present process is not one of catalyst inactivation, because the catalysts in the reaction product mixtures treated can be entirely spent and incapable of promoting further polymerization of the monomers. Catalyst residues which cause degradation of ethylene copolymers can be entirely inactive as polymerization catalysts even though active as degradation agents.

The anti-degradation agents of this invention are, in general, Lewis bases. Typical of these are furan, aniline, trimethanolamine, triethanolamine, tripropanolamine, triethylamine, trimethylamine, tripropylamine, diethanolamine, diethylamine, and other primary, secondary, and tertiary amines. These can be aromatic, aliphatic, or alicyclic in structure. Other useful agents include dialkylaluminum alkoxides such as diethylaluminum ethoxide, and dimethylaluminum methoxide. It is not necessary that the anti-degradation agent be a strong base; weak bases are also useful although longer reaction times may then be necessary. Thus ethers and alcohols generally can be used. Specific useful compounds in these classes include diethyl ether, ethyl propyl ether, dipropyl ether, etc., and methyl-, ethyl-, propyl-, butyl-alcohols and the like. A preferred Lewis base is tetrahydrofuran. Inorganic bases such as alkali and alkaline earth metal oxides and hydroxides can also be utilized although these are less convenient because of probable insolubility in the crude polymerization reaction solution. With adequate stirring or other means to provide sufficient contact between the base and the catalyst residue compounds these materials can be used.

In carrying out the invention it is important that at least about two-tenths mole of Lewis base be added to the crude polymerization solution per atom of aluminum in the solution. Usually not more than five moles of the Lewis base will be necessary and in a continuous process involving recycle, excess base over that required to prevent polymer degradation should be avoided to avoid contamination of the catalyst and to avoid the need to later remove the excess base because of a possible inhibiting effect on subsequent curing of the polymer. Apart from this, more than five moles of the anti-degradation agent is not detrimental. Preferably about ½–2 moles of Lewis base is utilized per atom of aluminium in the solution being treated. Those skilled in the art can readily determine the optimum amount of anti-degradation agent in any particular instance.

In operating this process, a Lewis base is added to the polymerization reaction product solution and after adequate mixing to provide good contact between the catalyst residues and Lewis base, the polymer is further processed without concern about degradation due to high temperatures up to the decomposition temperature of the polymer. Catalyst residues which cause heat degradation tre apparently inactivated by the treatment and need not be removed unless desired.

The process of this invention is useful with sulfur-curable ethylene copolymers, that is, ethylene copolymers which contain at least 0.2 gram mole of ethylenic carbon-to-carbon double bonds per kilogram. Usually another alpha-olefin (such as propylene) with the structure $$R-CH=CH_2$$

where R is $C_1$–$C_{16}$ alkyl is copolymerized therewith. These polymers particularly include ethylene/propylene/diene (EPDM) polymers in which the diene is a non-conjugated diene containing only one terminal double bond. The diene is preferably an acyclic diene containing 6–22 carbon atoms such as 1,4-hexadiene, 1,4-heptadiene, 1,4-octadiene, 6-methyl-1,5-heptadiene, and 7-methyl-1,6-octadiene; but other dienes such as 5-methylene-2-norbornene, ethylidene norbornene and dicyclopentadiene can be used.

In accordance with a preferred embodiment of this invention a polymerization reaction product solution prepared by polymerization of ethylene, propylene and 1,4-hexadiene with a vanadium/organoaluminum catalyst containing halogen is admixed with ½–2 moles tetrahydrofuran per atom of aluminum in the solution and then treated to recover the polymer by phase decantation. With reference to the drawing, if the solvent solution of the polymer is heated at constant pressure, thereby crossing the precipitation line, the solution will form two phases, most of the polymer (i.e., over 90%) going into the bottom phase, and the upper phase being almost all solvent. The concentration of the polymer in the bottom phase is controlled by the temperature and pressure of the system. For example, a given polymer in hexane was found to form a bottom phase at 190° C. in which the amount of solvent was 2.6 lbs./lb. of polymer, whereas at 220° C. the bottom phase contained 1.45 lbs./lb. polymer (pressure being just above the solution vapor pressure in both cases). It is desirable to decant a bottom phase which is at least 30 percent, preferably at least 50 percent polymer.

The exact phase diagram will vary for each different solvent and for each solvent the diagram will shift slightly according to the concentration of polymer in the solution. Further, the amount of unpolymerized monomer, such as propylene, will have its effect on the diagram. Naturally, it is desirable to operate at as low a temperature as will effect an adequate separation of the phases and the solvent. Otherwise, the solvent is not particularly critical. The process is especially useful for separating polymers from their solutions in hydrocarbons, such as pentane, hexane, or heptane, in concentrations of about 5 to 20 percent by weight.

It is not particularly critical how the temperature and pressure are changed so as to arrive within the two-phase zone. One feasible method is to select a suitable pressure and then heat the polymer solution at that pressure. Preferably, heat and pressure are applied to maintain a single liquid phase above the precipitation line and then the pressure is lowered until two phases are produced as shown by the two-phase zone of the drawing.

The phase decantation procedure can be operated somewhat above the critical temperature and above or below the critical pressure of the solvent. It is only necessary that the temperature and pressure are selected so that both phases behave like liquids.

It may be desirable to incorporate a processing oil into the elastomer by adding the oil after decantation but before evaporation. Preferably, the oil is added, in the amount desired, to a mixer into which is decanted the polymer-rich phase. The mixing and solution of the oil and polymer-rich phase is accomplished with surprising ease. Any processing oil well known to those skilled in the art as generally applicable to the oil-extension of ethylene copolymer elastomers can be employed, e.g., those mentioned in Introduction to Rubber Technology, Ed. by M. Morton, Reinhold Publishing Co., N.Y., 1959, chapter 7, and Canadian Patent 962,519. If the oil is added to the solution before decantation, it tends to distribute much in the same way as the solvent (if no carbon black is present). It is found that the presence of oil assists in isolation of the polymer by flash evaporation by reducing the tendency for the undesirable formation of powdered polymer.

Carbon black added to the solution before decantation, tends to go entirely into the polymer-rich phase. If both oil and black are added before decantation, most of the oil will go into the polymer-rich lower phase as well. The amounts and types of carbon black added are well known to those skilled in the art. Oil-coated carbon blacks such as described in U.S. Patent 3,203,916 are especially suitable. Typically 30 to 150 parts of black per 100 parts of copolymer are employed.

After phase separation has occurred, the upper solvent phase can be removed by decantation or other suitable means. When water is absent, this phase can be recycled without purification for preparing more copolymer by coordination polymerization. The polymer-rich lower phase, optionally containing processing oil and/or solid filler such as carbon black, can be then freed from residual solvent and monomers by flashing. Less than 1%, preferably less than 0.3% solvent remains. The drying copolymer can be formed in continuous coherent form, e.g., continuous filaments or ropes. Since most of the volatile solubilizing medium is removed in the decantation, flashing the solvent does not require a large, expensive vacuum system as would be the case if the copolymer solution were isolated directly by flashing of all the solubilizing media present. The present invention, in combination with phase decantation recovery of the polymer, avoids the difficulties resulting from attempting to separate sticky dry polymer from a very large volume of solvent and vapor.

When the copolymer solution being treated is anhydrous, the volatile components separated in the last stage of the process can be returned directly to the reactor if desired. When the process is operated on an anhydrous basis, there is avoided the considerable expense of removing water from the monomers and hydrocarbon solvent before they are reused.

The process of the present invention is versatile enough to handle a wide range of polymer types. Representative ethylene/propylene/1,4 - hexadiene copolymers employed can have Mooney viscosities (ML–4/250° F.) ranging from as low as 10.5 to at least as high as 70. The low Mooney polymer is particularly convenient to handle because the polymer-rich phase is less viscous and settles cleanly. When the rubber-like copolymer has a higher Mooney viscosity, e.g., 70, the polymer-rich phase may be more viscous.

All parts, percentages and proportions referred to herein are by weight unless otherwise indicated. The following examples illustrate the invention.

EXAMPLE 1

(A) Preparation of EPH polymer

A mixture of gaseous ethylene and propylene is introduced into a compressor operated at 500 lbs./sq. in. gauge; the liquified mixture leaving the compressor is subsequently joined by a stream containing 10 volume percent 1,4-hexadiene in hexane. The resulting monomer solution then enters a 1-liter 1-phase liquid-full continuous pressure reactor in which a $VOCl_3$/diisobutyl aluminum chloride coordination catalyst is continuously formed by separate introduction of hexane solutions of the components. Ethylene/propylene/1,4-hexadiene polymer is formed at the rate of 0.434 lb./hr. under the following conditions.

Monomer feed rate:
    Ethylene _____ pounds/hour__ 0.275
    Propylene _____ do____ 0.36
    1,4-hexadiene _____ do____ 0.034
Vanadium feed rate: _____ millimoles/hr__ 0.135
Catalyst molar proportions:
    Diisobutyl AlCl _____ 50
    Hexachloropropylene _____ 40
    $VOCl_3$ _____ 1
    Reactor temperature _____ °C__ 35
    Reactor pressure _____ lb./sq. in. gauge__ 400
    Residence time _____ minutes__ 20

The terpolymer thus prepared contains 56.3 weight percent ethylene units; 40.1 weight percent propylene units; and 3.6% total 1,4-hexadiene units. The Wallace plasticity is 28.

(B) Introduction of tetrahydrofuran (THF) in reactor effluent

A solution is prepared containing 20 milliliters of tetrahydrofurane (THF) in 3.5 liters of hexane. The polymerization reactor effluent, obtained by the procedure described in A, is mixed with enough of this solution to supply one gram-mole of THF for every gram-atom of aluminum present. This is done by pressuring the THF solution into the reactor effluent line at a point close to the reactor. The reactor effluent is not exposed to air, moisture, other additives, or stabilizers.

The treated polymer solution, which is stable to high temperatures, then passes through a monomer flasher, operated at 50° C. and 1.0 lb./sq. inch gauge, where most of the unreacted ethylene and propylene, and some of the 1,4-hexadiene, are removed. The emerging solution is practically colorless.

A sample of the polymer, isolated for analysis by evaporation of residual solvent at a temperature of 110° C. on a drum drier, contains 57.6 weight percent ethylene units, 38.8 weight percent propylene units, and 3.6 weight percent 1,4-hexadiene units. Its Wallace plasticity is 29.

(C) Isolation of EPH polymer by phase decantation

The THF-treated polymer solution emerging from the monomer flasher in accordance with the procedure of B is heated at 1000 lbs./sq. inch gauge to 215–225° C. by passage through heating coils over a 16–17 minute period and then pumped through a pressure sight glass of 103 milliliter volume, with a side entrance port and exits at both top and bottom. The decanter and the surrounding coils, through which oil flows at 235–240° C., are enclosed by insulation. The temperature at the decanter top is about 215–225° C.; at the bottom it is about 200–220° C. The pressure in the decanter is maintained at about 400 lbs./sq. inch gauge by means of a second pressure let-down valve connected to the top decanter exit port. The residence time for the THF-treated EPH polymer solution through the decanter is about 3–4 minutes. Precipitation of an EPH polymer-rich phase occurs after the first pressure let-down valve; in the decanter the EPH polymer-rich phase settles from an upper phase of almost pure hexane which leaves the decanter via the top port and a second pressure let-down valve and is cooled before being collected in a receiver. The EPH polymer-rich phase leaves the decanter through the bottom port. The decantation rate is controlled to maintain a constant level of EPH polymer-rich phase in the decanter.

A sample of the decanter bottom-port effluent, removed for analysis and obtained by evaporation of residual solvent and tetrahydrofuran at 70° C. in a vacuum oven, contains 61.3% ethylene, 35.2% propylene and 3.5% total 1,4-hexadiene.

When the analytical sample of EPH polymer is reacted with bromine, substantially no HBr is evolved; such behavior is typical of the EPH rubber directly isolated from the reactor itself and indicates that excessive branching resulting from rearrangement of the polymer chain in the isolation process has not occurred. The bromine uptake corresponds to about 0.3 gram-mole of carbon-carbon double bonds for every kilogram of EPH polymer. This value is substantially the same as that observed for the EPH polymer directly removed from the polymerization reactor and indicates that unsaturation-reducing degradation has not occurred during exposure of the rubber to high temperature phase decantation.

The main portion of the effluent from the decanter passes through the bottom port, then through a needle valve and is subsequently freed from remaining solvent by flashing at reduced pressure. The dried EPH polymer is removed from the flash chamber by a screw extruder.

EXAMPLE 2

The following comparative example, outside the scope of the present invention, shows the adverse effect of isolating EPH polymer from an untreated solution containing residues of a regenerated organoaluminum/$VOCl_3$ coordination catalyst.

(A) Preparation of EPH polymer

An EPH polymer similar to that described in the above procedure, is prepared in the same apparatus. The general procedure is maintained as before, but using the following conditions.

Monomer feed rate:
    Ethylene _____ pounds/hour__ 0.148
    Propylene _____ do____ 0.19
    1,4-hexadiene _____ do____ 0.016
Vandium feed rate: _____ millimoles/hr__ 0.09
Catalyst molar proportions:
    Diisobutyl AlCl _____ 50
    Hexachloropropylene _____ 50
    $VOCl_3$ _____ 1
    Reactor temperature _____ °C__ 30
    Residence time _____ minutes__ 30

The EPH polymer is prepared at the rate of 0.25 lb./hr.

A reactor effluent sample, after being washed with dilute hydrochloric acid and water, is evaporated on a drum-drier operated at 110° C. The sample of colorless EPH polymer thus isolated has the following composition: ethylene, 58.3 weight percent; propylene 38 weight percent; total 1,4-hexadiene, 3.7 weight percent. The inherent viscosity, measured on a sample of 0.1 gram of EPH rubber in 100 milliliters of tetrachloroethylene at 30° C., is 1.9. The Wallace plasticity is 28.

When the copolymer is treated with bromine, 0.28 mole of bromine are consumed for every kilogram; HBr is not evolved. The unsaturation amounts to 0.28 gram-mole of carbon-carbon double bonds per kilogram. The absence of HBr evolution indicates that excessive branching has not occurred in the separation process.

(B) After the reactor effluent is passed through a monomer flasher in accordance with procedure given for Example 1, the polymer solution is passed into the phase decanter which is operated substantially as described in Example 1. In contrast to the result obtained while operating in accordance with the present invention, the THF-free polymer solution issuing from the phase decanter is drak brown, low viscosity material. When residual solvent is removed by treating the decanter effluent for about 3–4 hours in a vacuum at about 70° C., a sticky, tarry grease is obtained. Its inherent viscosity, measured as before, is about 0.5; its Wallace plasticity is too low to measure. The decrease in these values as compared with those of EPH rubber isolated with THF protection, shows that chain cleavage has occurred; branching alone could not account for so great a change. The protected EPH rubber absorbs only 0.28 gram-mole of bromine per kilogram, but the grease absorbs 1.00 gram-mole; furthermore, 0.82 gram-mole of HBr are evolved from the grease showing that only 0.18 gram-mole of carbon-carbon double bonds are present in the polymer product. The extensive evolution of HBr shows that isomerization and rearrangement have taken place.

This invention is directed to stabilization of ethylene subject to heat degradation during processing following formation of the copolymer as, for example, during recovery of the copolymer by phase decantation at elevated temperatures. It is particularly concerned with stabilization of such mixtures which contain halogen and aluminum, these normally resulting from use of a coordination catalyst containing these elements. The halogen and aluminum can originate in the same component of the catalyst, in different components; or one or both of them can originate in more than one component of the catalyst. Representative combinations of components which, when utilized as coordination catalysts to prepare sulfur curable ethylene copolymers, produce reaction product mixtures susceptible to heat degradation and which can be stabilized by means of this invention, include the following: $VOCl_3$/dialkyl aluminum halide, $VCl_4$/dialkyl aluminum halide, vanadium trisacetylacetonate/dialkyl aluminum halide, each of the aforementioned vanadium compounds in combination with an alkyl sesqui-halide, $TiCl_4$/lithium aluminum tetraalkyl, $VCl_4$/trialkyl aluminum, vanadium trisacetylacetonate/trialkyl aluminum/hexachloropropene, vanadium trisacetylacetonate/trialkyl aluminum/benzotrichloride, etc. All of these combinations and many other are well known to the art.

I claim:
1. The process for stabilizing against heat degradation a sulfur-curable ethylene copolymer crude reaction product mixture, resulting from copolymerization of ethylene with at least one α-olefin having 3–18 carbon atoms and a nonconjugated diene in the presence of a coordination catalyst containing halogen and aluminum, which process consists essentially of admixing the crude reaction mixture at a temperature and pressure which maintain the mixture in liquid phase with about 0.2–5 moles of a Lewis base per gram-atom of aluminum in said mixture.

2. The process of claim 1 in which the copolymer is prepared by polymerizing ethylene, propylene and a nonconjugated diene containing 6–22 carbon atoms and having only one terminal double bond.

3. The process of claim 2 in which the diene is 1,4-hexadiene.

4. The process of claim 2 in which the amount of Lewis Base is ½–2 gram-moles per gram-atom of aluminum.

5. The process of claim 4 in which the Lewis base is tetrahydrofuran.

6. The stabilized crude reaction product mixture produced by the process of claim 1.

7. The stabilized crude reaction product mixture produced by the process of claim 3.

8. The stabilized crude reaction product mixture produced by the process of claim 4.

9. The stabilized crude reaction product mixture produced by the process of claim 5.

10. The process for recovering a sulfur-curable ethylene copolymer, resulting from copolymerization of ethylene with at least one α-olefin having 3–18 carbon atoms and a nonconjugated diene in the presence of a coordination catalyst containing halogen and aluminum, which process consists essentially of the following steps:
(a) stabilizing against heat degradation the crude reaction product mixture by the process of claim 1;
(b) heating the stabilized crude reaction product mixture to a temperature at which said mixture separates into two liquid phases;
(c) separating the copolymer-rich phase from the solvent-rich phase; and
(d) recovering the copolymer from the polymer-rich phase.

References Cited
UNITED STATES PATENTS

| | | | |
|---|---|---|---|
| 3,324,090 | 6/1967 | Ross et al. | 260—80.78 |
| 3,341,503 | 9/1967 | Paige et al. | 260—80.78 |
| 3,361,691 | 1/1968 | Mazzeo | 260—23.7 |
| 3,362,943 | 1/1968 | Edwards et al. | 260—93.7 |
| 3,367,922 | 2/1968 | Sonnenfeld et al. | 260—80.78 |
| 3,369,011 | 2/1968 | Valvassori et al. | 260—88.2 |

HOSEA E. TAYLOR, JR., Primary Examiner

R. A. WHITE, Assistant Examiner

U.S. Cl. X.R.

260—33.6, 41, 45.7, 45.9, 45.95, 80.78, 96

Notice of Adverse Decision in Interference

In Interference No. 97,453 involving Patent No. 3,496,135, S. W. Caywood, Jr., CRUDE EPDM COPOLYMER STABILIZED WITH A LEWIS BASE, final judgment adverse to the patentee was rendered Nov. 2, 1972, as to claims 1, 2, 4, 6 and 8.

[*Official Gazette February 6, 1973.*]

Disclaimer 3,496,135.—*Stanley W. Caywood, Jr.*, Wilmington, Del. CRUDE EPDM CO-POLYMER STABILIZED WITH A LEWIS BASE. Patent dated Feb. 17, 1970. Disclaimer filed Sept. 1, 1972, by the assignee, *E. I. du Pont de Nemours and Company*.

Hereby enters this disclaimer to claims 1–9 of said patent.

[*Official Gazette May 20, 1975.*]